US00RE42483E

(19) United States
(12) Reissued Patent
Comeau

(10) Patent Number: US RE42,483 E
(45) Date of Reissued Patent: Jun. 28, 2011

(54) SANDAL

(75) Inventor: Dennis F. Comeau, Sante Fe, NM (US)

(73) Assignee: Bernardo Footwear, L.L.C., Sugar Land, TX (US)

() Term: 14 Years**

(21) Appl. No.: 29/302,144

(22) Filed: Jan. 10, 2008

Related U.S. Patent Documents

Reissue of:
(64) Patent No.: Des. 513,447
Issued: Jan. 10, 2006
Appl. No.: 29/220,752
Filed: Jan. 5, 2005

(51) LOC (9) Cl. ..... 02-04
(52) U.S. Cl. ..... D2/917
(58) Field of Classification Search ..... D2/896, D2/916–918, 969; 36/11.5, 1, 83
See application file for complete search history.

(56) References Cited

U.S. PATENT DOCUMENTS

| | | | | | |
|---|---|---|---|---|---|
| 736,194 | A | * | 8/1903 | Bassett | 36/11.5 |
| 1,068,382 | A | * | 7/1913 | Blanchard | 36/11.5 |
| 1,407,992 | A | * | 2/1922 | Doody | 36/11.5 |
| 1,484,178 | A | * | 2/1924 | Lagasse et al. | 36/7.7 |
| D64,213 | S | * | 3/1924 | Staples | D2/933 |
| D70,317 | S | * | 6/1926 | Coblentz | D2/933 |
| D86,393 | S | * | 3/1932 | Miller | D2/933 |
| D92,000 | S | * | 4/1934 | Heilbrunn | D2/918 |
| D92,201 | S | * | 5/1934 | Perugia | D2/917 |
| 1,964,705 | A | * | 6/1934 | Pellkofer | 36/11.5 |
| D97,788 | S | * | 12/1935 | Starr | D2/932 |
| D137,764 | S | * | 4/1944 | Goldstein | D2/918 |
| 2,402,227 | A | * | 6/1946 | Ihle | 36/25 R |
| D147,308 | S | * | 8/1947 | Steel | D2/917 |
| D149,179 | S | * | 4/1948 | Gregg | D2/916 |
| D166,025 | S | * | 2/1952 | Braun | D2/916 |
| D166,122 | S | * | 3/1952 | Pastine | D2/917 |
| D166,123 | S | * | 3/1952 | Pastine | D2/917 |
| D169,015 | S | * | 3/1953 | Sbicca | D2/917 |
| D170,768 | S | * | 11/1953 | Preti | D2/922 |
| D181,542 | S | * | 11/1957 | Miyachi et al. | D2/917 |
| D187,781 | S | * | 5/1960 | Hayakawa | D2/917 |
| 2,947,095 | A | * | 8/1960 | Miyachi | 36/11.5 |
| D195,163 | S | * | 5/1963 | Sandler | D2/916 |

(Continued)

FOREIGN PATENT DOCUMENTS

EP 0367565 A2 5/1990

(Continued)

OTHER PUBLICATIONS

Bernardo Sandlas, Inc., photograph of the 1947 original sandal design.

*Primary Examiner* — Dominic Simone
(74) *Attorney, Agent, or Firm* — Gilbreth & Associates, PC; J. M. (Mark) Gilbreth

(57) CLAIM

The ornamental design for a sandal, as shown and described.

DESCRIPTION

FIG. 1 is a perspective view of a sandal showing my new design[.];
FIG. 2 is a left side elevation view thereof[.];
FIG. 3 is a right side elevation view thereof[.];
FIG. 4 is a front elevation view thereof[.];
FIG. 5 is a rear elevation view thereof[.];
FIG. 6 is a top view thereof; and,
FIG. 7 is a bottom view thereof.
*Surfaces not shown form no part of the claimed design.*

1 Claim, 2 Drawing Sheets

Figure 1:
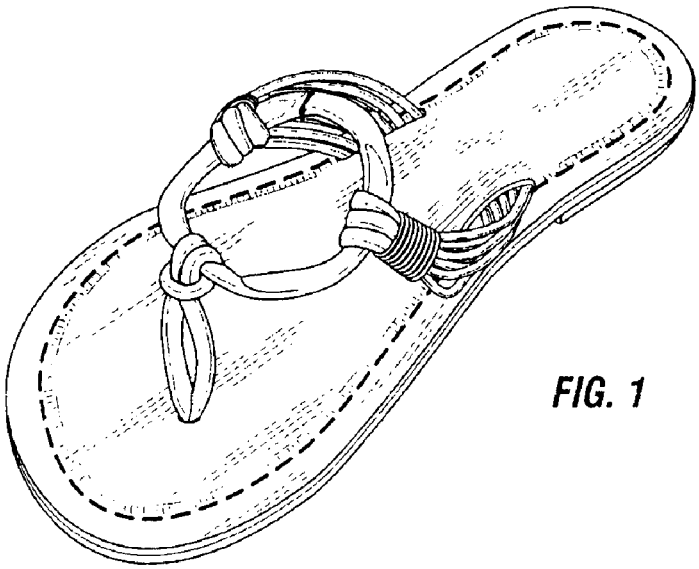
Figure 2:
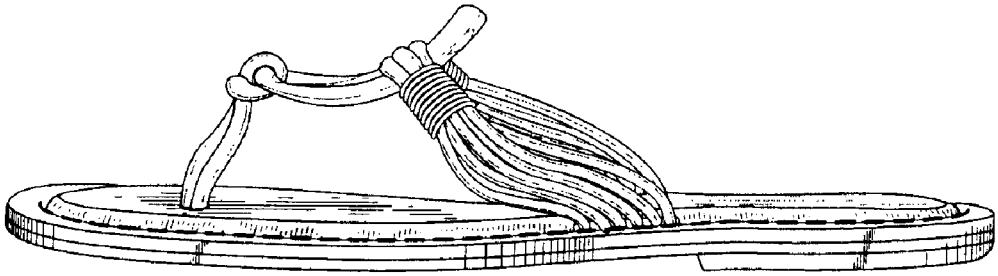
Figure 4:
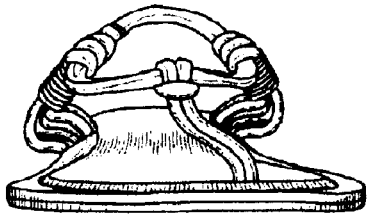
Figure 5:
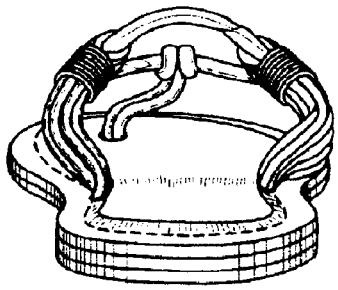
Figure 6:
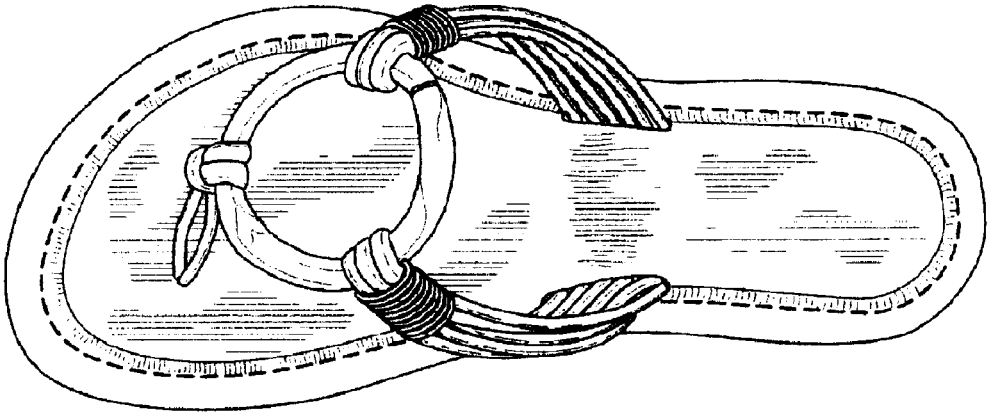
Figure 7:
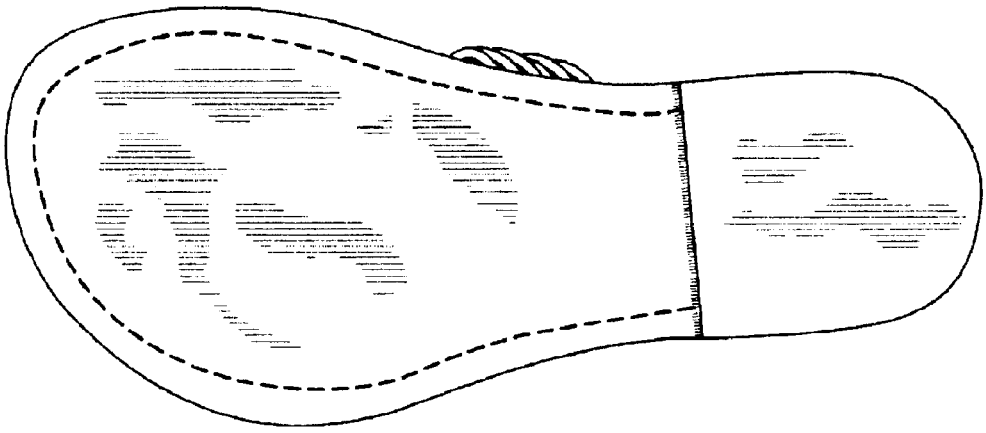

Matter enclosed in heavy brackets [ ] appears in the original patent, but forms no part of this reissue; matter printed in italics indicates the additions made by reissue.

U.S. PATENT DOCUMENTS

| | | | | | |
|---|---|---|---|---|---|
| D200,697 | S | * | 3/1965 | Joiner | D2/917 |
| 3,290,802 | A | * | 12/1966 | Fukuoka | 36/11.5 |
| 3,336,683 | A | * | 8/1967 | Schellkopf | 36/11.5 |
| D210,064 | S | * | 2/1968 | Huff | D2/919 |
| D215,401 | S | * | 9/1969 | Corboda de Balseiro | D2/918 |
| 3,739,501 | A | * | 6/1973 | Barrett, Jr. | 36/11.5 |
| 3,928,927 | A | * | 12/1975 | Brown et al. | 36/11.5 |
| 3,978,596 | A | * | 9/1976 | Brown et al. | 36/11.5 |
| 4,051,610 | A | * | 10/1977 | Shigeji | 36/11.5 |
| D254,521 | S | * | 3/1980 | Katz | D2/917 |
| 4,471,539 | A | * | 9/1984 | Mann | 36/11.5 |
| D279,326 | S | * | 6/1985 | Foldes | D2/916 |
| 4,530,171 | A | * | 7/1985 | Zabala | 36/11.5 |
| 4,584,782 | A | * | 4/1986 | Thatcher | 36/11.5 |
| D293,963 | S | * | 2/1988 | Maciel | D2/917 |
| D338,320 | S | * | 8/1993 | Haggar | D2/917 |
| D352,382 | S | * | 11/1994 | Chuang | D2/917 |
| D354,843 | S | * | 1/1995 | Atkins et al. | D2/916 |
| 5,794,360 | A | * | 8/1998 | Bell et al. | 36/11.5 |
| D404,894 | S | * | 2/1999 | Kelley | D2/917 |
| D417,942 | S | * | 12/1999 | Aguerre | D2/916 |
| D418,280 | S | * | 1/2000 | Kieler | D2/916 |
| D419,283 | S | * | 1/2000 | Coito | D2/917 |
| D437,475 | S | * | 2/2001 | Kieler | D2/916 |
| 6,237,250 | B1 | * | 5/2001 | Aguerre | 36/11.5 |
| D448,146 | S | * | 9/2001 | Jacobs | D2/917 |
| D448,542 | S | * | 10/2001 | Bryant | D2/917 |
| D449,918 | S | * | 11/2001 | Boncutter | D2/917 |
| D456,123 | S | * | 4/2002 | Powell | D2/917 |
| 6,508,016 | B1 | * | 1/2003 | Boncutter et al. | 36/11.5 |
| D470,648 | S | * | 2/2003 | Jacobs | D2/917 |
| 6,516,538 | B2 | * | 2/2003 | Kraft | 36/11.5 |
| D487,183 | S | * | 3/2004 | Cumeau | D2/917 |
| D489,517 | S | * | 5/2004 | Comeau | D2/917 |
| D495,855 | S | * | 9/2004 | Comeau | D2/917 |
| D496,147 | S | * | 9/2004 | Comeau | D2/917 |

FOREIGN PATENT DOCUMENTS

| | | |
|---|---|---|
| JP | 07039403 | 2/1995 |

* cited by examiner

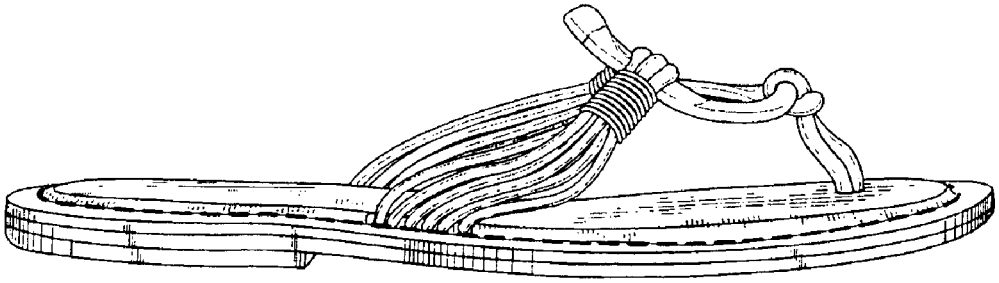
FIG. 3
AMENDED